United States Patent
Ye et al.

(10) Patent No.: US 10,979,099 B2
(45) Date of Patent: Apr. 13, 2021

(54) DETECTION OF HOPPING CHANNEL FOR UNLICENSED INTERNET OF THINGS

(71) Applicant: INTEL IP CORPORATION, Santa Clara, CA (US)

(72) Inventors: Qiaoyang Ye, San Jose, CA (US); Huaning Niu, San Jose, CA (US); Wenting Chang, Beijing (CN); Salvatore Talarico, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/466,000

(22) PCT Filed: Feb. 2, 2018

(86) PCT No.: PCT/US2018/016737
§ 371 (c)(1),
(2) Date: May 31, 2019

(87) PCT Pub. No.: WO2018/144942
PCT Pub. Date: Aug. 9, 2018

(65) Prior Publication Data
US 2019/0296790 A1    Sep. 26, 2019

Related U.S. Application Data

(60) Provisional application No. 62/573,459, filed on Oct. 17, 2017, provisional application No. 62/540,446, (Continued)

(51) Int. Cl.
*H04L 5/00* (2006.01)
*H04B 1/7136* (2011.01)
(Continued)

(52) U.S. Cl.
CPC ......... *H04B 1/7136* (2013.01); *H04B 1/7156* (2013.01); *H04J 11/0023* (2013.01);
(Continued)

(58) Field of Classification Search
CPC ..... H04L 5/005; H04L 1/0038; H04L 27/265; H04B 1/7136; H04W 74/0825; H04J 13/0062
See application file for complete search history.

(56) References Cited

U.S. PATENT DOCUMENTS 6,169,761 B1    1/2001    Marcoccia et al.
6,400,751 B1 *    6/2002    Rodgers ................. H04B 1/715
                                                                                     375/132
(Continued)

FOREIGN PATENT DOCUMENTS

GB        2493986 A  *   2/2013   ............ H04W 16/14
GB        2493986 A       2/2013
(Continued)

OTHER PUBLICATIONS

MulteFire Technology Progress and Benefits, and How It Enables a New Breed of Neutral Hosts; May 24, 2016; Qualcomm Technologies, Inc.

*Primary Examiner* — Jamal Javaid
(74) *Attorney, Agent, or Firm* — Alliance IP, LLC

(57) ABSTRACT

Technology for a next generation node B (gNB) operable for frequency hopping in MulteFire communications is disclosed. The gNB can perform a clear channel assessment (CCA) for a selected hopping frequency. The gNB can identify a next hopping frequency in a set of hopping frequencies when an energy detection of the CCA is greater than a selected threshold. The gNB can encode data for a downlink transmission at a selected dwell time of a determined hopping frequency in the set of hopping frequencies
(Continued)

when an energy detection of the CCA is less than a selected threshold.

6 Claims, 13 Drawing Sheets

Related U.S. Application Data filed on Aug. 2, 2017, provisional application No. 62/454,669, filed on Feb. 3, 2017.

(51) Int. Cl.
*H04J 13/00* (2011.01)
*H04L 1/00* (2006.01)
*H04L 27/26* (2006.01)
*H04W 74/08* (2009.01)
*H04B 1/7156* (2011.01)
*H04J 11/00* (2006.01)

(52) U.S. Cl.
CPC ........ *H04J 13/0062* (2013.01); *H04L 1/0038* (2013.01); *H04L 5/005* (2013.01); *H04L 27/2605* (2013.01); *H04W 74/0825* (2013.01); *H04B 2001/71563* (2013.01); *H04L 5/0007* (2013.01)

(56) References Cited

U.S. PATENT DOCUMENTS

| | | |
|---|---|---|
| 2009/0154529 A1 | 6/2009 | Cho et al. |
| 2012/0307744 A1 | 12/2012 | Gilles et al. |
| 2017/0135052 A1* | 5/2017 | Lei ..................... H04J 13/0062 |

FOREIGN PATENT DOCUMENTS

| | | |
|---|---|---|
| WO | 2012164531 A1 | 12/2012 |
| WO | 2018064525 A1 | 4/2018 |

* cited by examiner

DETECTION OF HOPPING CHANNEL FOR UNLICENSED INTERNET OF THINGS

BACKGROUND

Wireless systems typically include multiple User Equipment (UE) devices communicatively coupled to one or more Base Stations (BS). The one or more BSs may be Long Term Evolved (LTE) evolved NodeBs (eNB) or new radio (NR) NodeBs (gNB) or next generation node Bs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
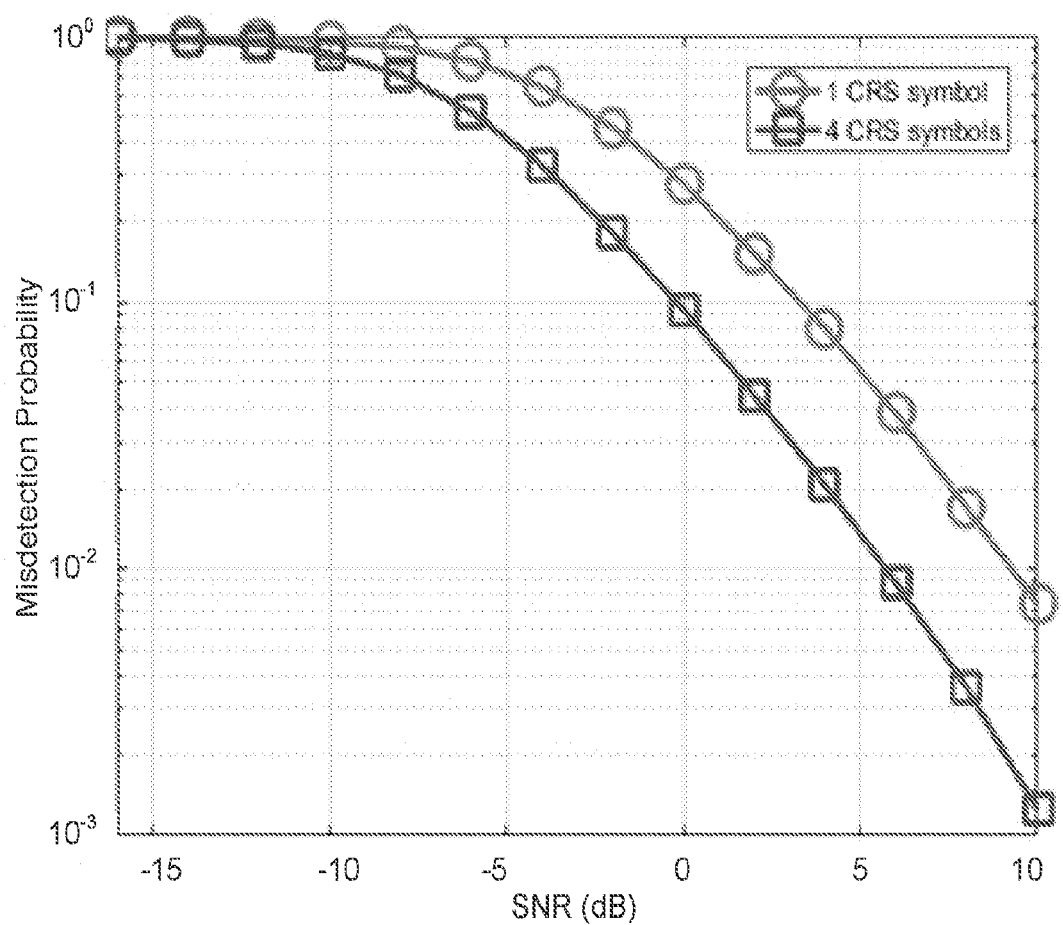
FIG. 1 illustrates link level results in terms of probability of misdetection versus Signal-to-Noise Ratio (SNR) in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Internet of Things (IoT) is envisioned as a significantly important technology, that may change our daily life by enabling connectivity between a multitude of devices. IoT can have wide applications in various scenarios, including smart cities, smart environment, smart agriculture, and smart health systems.

The 3$^{rd}$ Generation Partnership Project (3GPP) has standardized two designs to support IoT services—enhanced Machine Type Communication (eMTC) and Narrow Band IoT (NB-IoT). Because eMTC and NB-IoT user equipments (UEs) will be deployed in huge numbers, lowering the cost of these UEs can be a key enabler for implementation of IoT. Also, low power consumption can be desirable to extend the life time of the battery. In addition, there can be substantial use cases of devices deployed deep inside buildings which could have coverage enhancement in comparison to the defined long term evolution (LTE) cell coverage footprint. In summary, eMTC and NB-IoT techniques can be designed to ensure that the UEs have low cost, low power consumption, and enhanced coverage.

Both 3GPP Release 13 eMTC and 3GPP Release 13 NB-IoT can operate in licensed spectrum. On the other hand, the scarcity of licensed spectrum in the low frequency band can result in a deficit in the data rate boost. Thus, there are emerging interests in the operation of 3GPP LTE systems in unlicensed spectrum.

Potential 3GPP LTE operation in unlicensed spectrum includes but is not limited to the Carrier Aggregation based LAA (licensed assisted access)/eLAA (enhanced LLA) systems, 3GPP LTE operation in the unlicensed spectrum via dual connectivity (DC), and the standalone 3GPP LTE system in the unlicensed spectrum, where LTE-based technology solely operates in unlicensed spectrum without using an "anchor" in licensed spectrum—called MulteFire (MF).

To extend the benefits of 3GPP LTE IoT designs into unlicensed spectrum, MulteFire 1.1 is expected to specify the design for Unlicensed-IoT (U-IoT). The current application falls in the scope of the U-IoT systems, with a focus on the eMTC based U-IoT design. Note that similar approaches can be used for NB-IoT based U-IoT design as well.

The unlicensed frequency band of interest in this application can be the 2.4 GHz band or other unlicensed frequency bands. For global availability, the design should abide by the regulations in different regions, e.g. the regulations given by the federal communications commission (FCC) in the US, the regulations given by the European Telecommunications Standards Institute (ETSI) in Europe, or regulations given by other governmental bodies designated to oversee communications. Based on these regulations, frequency hopping can be more appropriate than other forms of modulations, due to more relaxed power spectrum density (PSD) limitations for frequency hopping. Specifically, frequency hopping has no PSD limit while other wide band modulations have a PSD limit of 10 decibel-milliwatts (dBm)/megahertz (MHz) in regulations given by ETSI. The low PSD limit can result in limited coverage. Thus, this application focuses on the U-IoT with frequency hopping.

There are two types of frequency hopping: non-adaptive frequency hopping and adaptive frequency hopping. For non-adaptive frequency hopping, the regulations in Europe use Medium Utilization (MU) up to 10%, where MU is defined as (radio-frequency (RF) output power/100 milliwatts (mW)*Duty cycle). This can limit the downlink (DL) transmission time, which can be acceptable when UL traffic is heavy but is not applicable for more general cases. Thus, a focus on adaptive frequency hopping can be useful in overcoming the limit in the DL transmission time. The regulations in Europe for adaptive frequency hopping using listen-before-talk (LBT) based Detect And Avoid (DAA) have been promulgated.

With adaptive frequency hopping, the evolved node B (eNB) may or may not skip some channels or frequencies due to LBT failure. When the eNB skips some busy channels or frequencies, UEs need to blindly detect which channel or frequencies the eNB has hopped to.

The UEs can know which channel or frequencies the eNB has hopped to in various ways. For example, when the eNB skips the channel due to LBT failure, the eNB can indicate if it will skip the channel semi-statically e.g. via system information, such as master information block (MIB) or system information block (SIB). If the eNB does not skip the channel, the UEs can follow the predefined or indicated frequency hopping sequence for reception of DL transmission. When the eNB is configured to skip busy channels for downlink (DL), an initial signal at the start of a DL maximum channel occupancy time (MCOT) can facilitate the detection of the hopping channel. Moreover, the initial signal can also carry the information on the frame structure in dynamic time division duplexing (TDD) scenarios. The initial signal can also be referred to as a detection signal.

An initial signal or detection signal can be designed in various ways to facilitate the detection of the hopping channel. A hopping channel can also be referred to herein as a hopping frequency. In one example, cell-specific reference signal (CRS) can be used for presence detection. In the U-IoT design for MF, the presence detection for the initial signal should comply with a target maximum coupling loss (MCL) of 130 dB per 20 dBm effective isotropic radiated power (EIRP) with a receiver noise figure of 9 dB.

As illustrated in FIG. 1, link-level simulations show that the legacy CRS design does not reach the target MCL of 130 dB per 20 dBm EIRP. In the case of one CRS symbol as shown by the line with the circles, the graph of signal to noise ratio (SNR) in dB versus misdetection probability shows that the target MCL is not reached by the legacy CRS design. In the case of 4 CRS symbols, as shown by the line with the squares, the graph of signal to noise ratio (SNR) in dB versus misdetection probability shows that the target MCL is not reached by the legacy CRS design. In one example, the CRS can be power boosted in order to meet the MCL target. In another example, the density of the CRS can be increased in order to increase the presence detection performance and reach the MCL target.

In another example, an ad-hoc initial signal or detection signal can be designed in various ways. The initial signal can start at time X of a subframe, in which the time before time X can be used for channel switching and/or a channel access procedure, such as clear channel assessment (CCA) sensing.

A channel access procedure, such as CCA sensing can be performed for a selected hopping frequency. When the energy detection of the CCA is greater than a selected threshold, then a next hopping frequency can be hopped to. When the energy detection of the CCA is lower than a selected threshold, then data can be encoded for downlink transmission at a selected dwell time of a determined hopping frequency.

Figure 2A:
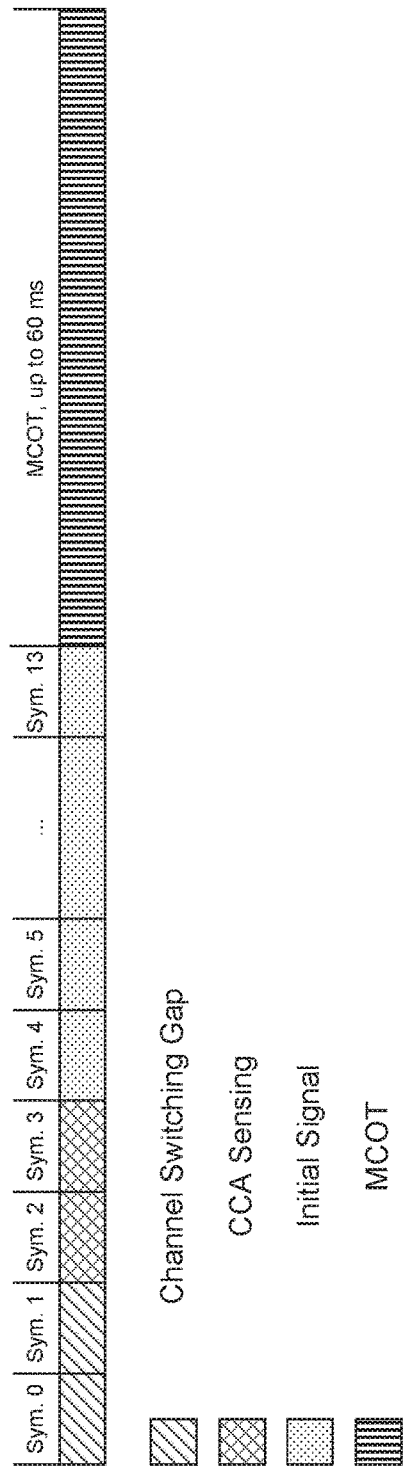
FIG. 2*a* illustrates an initial signal in accordance with an example.

In one example, as illustrated in FIG. 2a, time X can be the start of symbol 4. In this example, the first two symbols (i.e. symbols 0 and 1) can be used for channel switching and the following two symbols (i.e. symbols 2 and 3) can be used for CCA sensing.

Figure 2B:
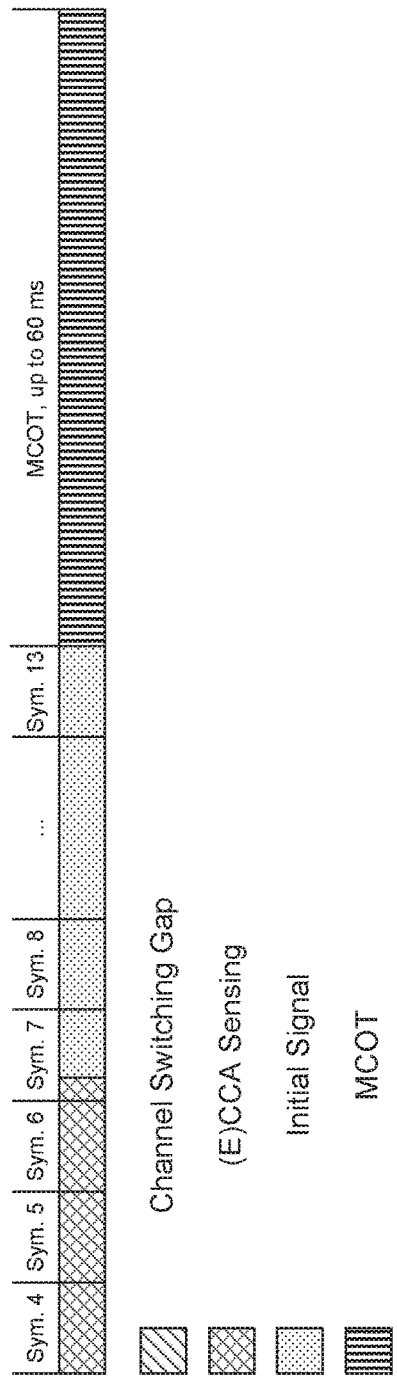
FIG. 2*b* illustrates an initial signal in accordance with an example.

In another example, as illustrated in FIG. 2b, time X can a fraction of symbol duration and can start partially into symbol 7. This case can be applied for extended CCA (ECCA) sensing, in which the sensing duration can be randomly generated.

A detection signal or initial signal can be located after the CCA sensing, wherein the detection signal can comprise a plurality of cell-specific reference signals (CRS) to enable a user equipment (UE) to detect the dwell time of a determined hopping frequency. The plurality of CRSs can have a Zadoff-Chu structure.

Figure 3:
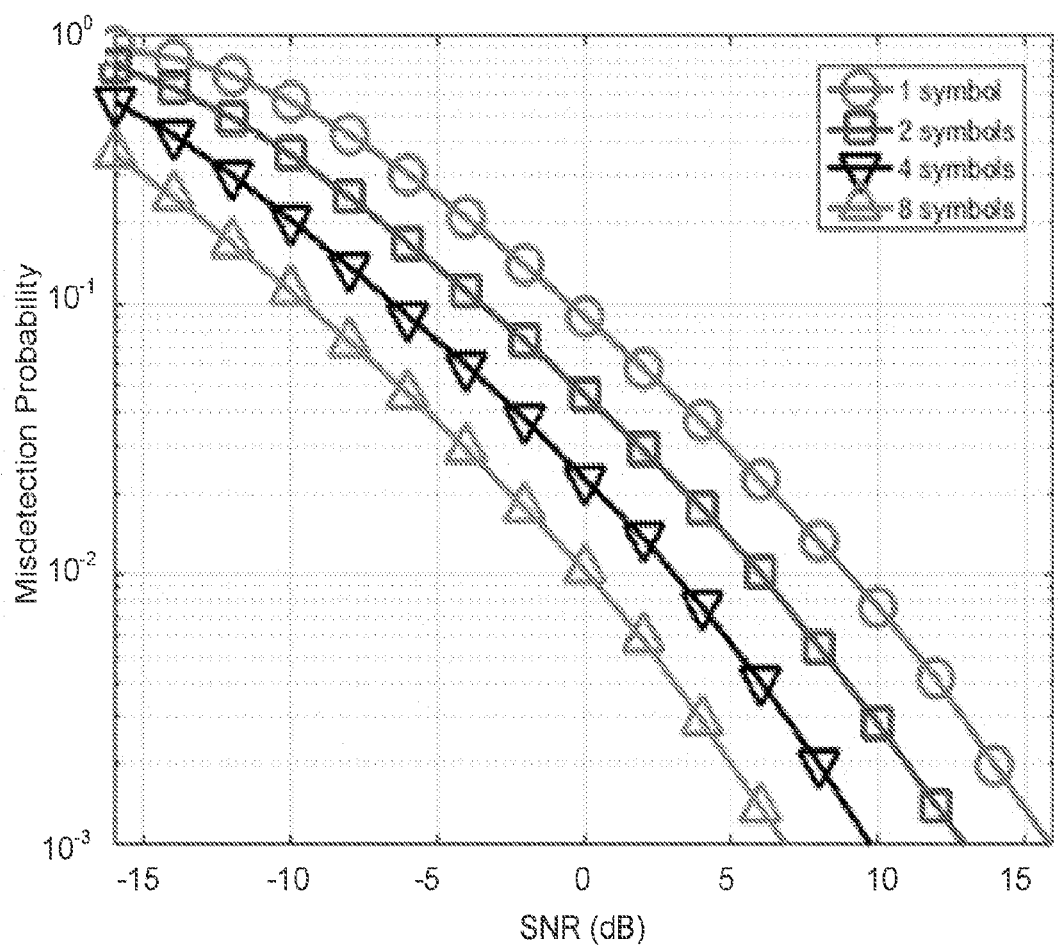
FIG. 3 illustrates link level results in terms of probability of misdetection versus Signal-to-Noise Ratio (SNR) in accordance with an example.

In another example, the initial signal or detection signal can span over Y symbols, which can include $Y_1$ symbols carrying a sequence and $Y_2$ symbols carrying data. As previously discussed, the presence detection for the initial signal should comply with a target MCL of 130 dB per 20 dBm EIRP. As illustrated in FIG. 3, link level simulations show that the initial signal should have a minimum length of at least: 8 orthogonal frequency division multiplexing (OFDM) symbols in order to reach this target MCL if the receiver noise figure is 13 dB, or 4 OFDM symbols in order to reach this target MCL if the receiver noise figure is 9 dB.

FIG. 3 shows link level results in terms of probability of misdetection versus SNR as parametrized by the number of OFDM symbols over which the initial signal extends for 6 physical resource blocks (PRBs). In the case of 1 OFDM symbol, the probability of misdetection can be too high for a noise figure of 13 dB. In the case of 2 OFDM symbols, the probability of misdetection can be too high for a noise figure of 13 dB. In the case of 4 OFDM symbols, the probability of misdetection can be too high for a noise figure of 13 dB. In the case of 8 OFDM symbols, the probability of misdetection can be acceptable for a noise figure of 13 dB.

In the case of 1 OFDM symbol, the probability of misdetection can be too high for a noise figure of 9 dB. In the case of 2 OFDM symbols, the probability of misdetection can be too high for a noise figure of 9 dB. In the case of 4 OFDM symbols, the probability of misdetection can be acceptable for a noise figure of 9 dB. In the case of 8 OFDM symbols, the probability of misdetection can be acceptable for a noise figure of 9 dB.

Figure 4:
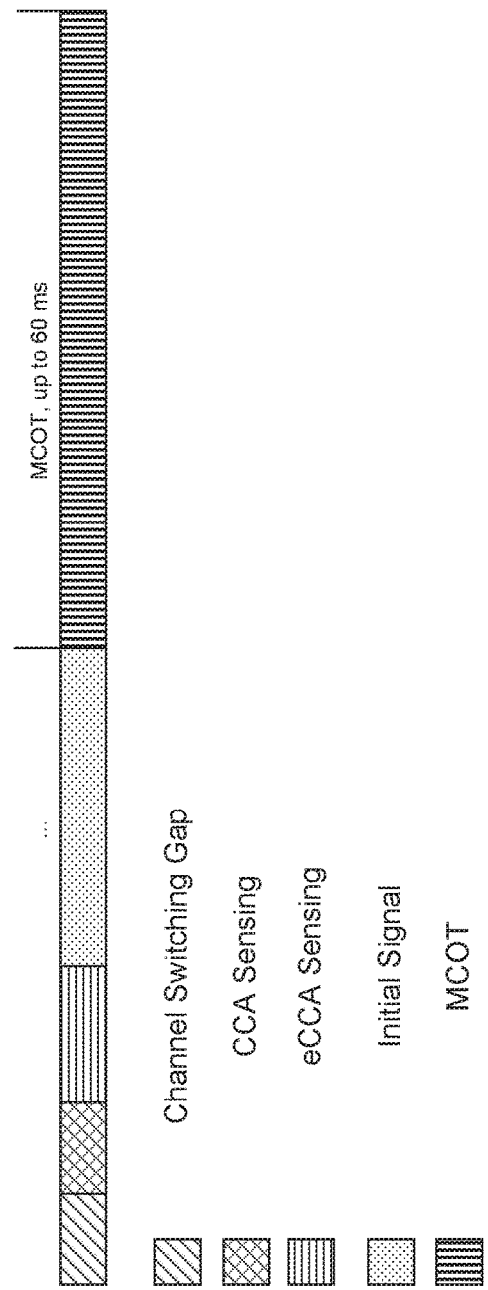
FIG. 4 illustrates a structure of the hopped channel in accordance with an example.

In another example, as illustrated in FIG. 4, the hopped channel or hopped frequency can have a structure wherein symbols are allocated for channel switching, followed by CCA sensing, followed by eCCA sensing, followed by the initial signal, and followed by the MCOT. In one example, the initial signal can start after 2 symbols used for channel switching. In one embodiment, CCA is performed, and if it fails, it can be followed by eCCA sensing, which can be repeated until the channel is sensed to be available. eCCA sensing can be performed when the energy detection of the CCA is greater than a selected threshold. The eCCA can be continued for up to 2 OFDM symbols plus an additional 1 ms.

In one example, if the CCA sensing operation can be 9 OFDM symbols long, then the initial signal, which can have a minimum length of 8 OFDM symbols long, can extend over 2 subframes up until the $4^{th}$ symbol of the second subframe. If symbols are used for channel switching at the beginning of the first subframe, then the initial signal can extend even further.

In the structure of the hopped channel, as illustrated in FIG. 4, the total MCOT can be up to 80 milliseconds (ms). In another example, in order to preserve the periodicity of the discovery reference signal (DRS) to a multiple of 80 ms, the MCOT can be 75 ms or a value that is consistent with the periodicity of the anchor channel (i.e. 80 ms).

In one example, the initial symbols can span over Y symbols, in which Y is 10 symbols long. In another example, Y can be 17 or 24 symbols, which correspond to the remaining symbols within the subframe performing CCA sensing plus a slot or a subframe following the initial subframe. Y can also be fractional rather than an integer number. This can apply in cases with eCCA, wherein the eCCA sensing can be randomly generated.

In another example, because eCCA can be completed at various times, $Y_1$ can be adjustable with dependence on the completion of the eCCA, while $Y_2$ can be fixed.

In another example, $Y_1$ can have a limit which can be defined as greater than or equal to N and less than M, where N and M are positive integers that can be predefined or semi-statically configured. For example, M can be equal to N+1 and N can be 7 as illustrated in FIG. 2b.

The initial signal or detection signal structure can have various designs. In one example, a sequence can be transmitted on Y symbols, in which $Y_1$=Y and $Y_2$=0. For example, symbols 4 through 13 in FIG. 2a carry a sequence for presence detection.

In another example, $Y_1$ symbols can carry the sequence and $Y_2$ symbols can carry the data, indicating the frame structure. The physical channel used for the data transmission can be based on physical downlink control channel (PDCCH), enhanced PDCCH (ePDCCH) or physical downlink shared channel (PDSCH). For example, in FIG. 2b, symbols 4 through 10 can carry the sequence and symbols 11-13 can carry the data.

In another example, the initial symbol can start at a fractional duration rather than at a symbol boundary. In one example, the first partial symbol can be an extended cyclic prefix (CP) for the following symbol. As illustrated in FIG. 2b, the initial signal part of symbol 7 can be the extended CP of symbol 8.

In another example, the eNB can transmit some reservation signal that can be transparent to the UE, and the initial signal can begin at the following symbol boundary.

The sequence can have various designs. The base sequence can be a Zadoff-Chu (ZC) sequence or a pseudo-random sequence. In one example, a length 71 ZC sequence with a root q can be used, and can depend on the cell identification (ID) or be fixed, and can be repeated in the time domain over the multiple symbols over which the initial signal extends.

In another example, a cyclic shift can be used. The cyclic shift can be selected from a group of cyclic shifts based on the hopping. To handle the intra-symbol and inter-symbol interference, an orthogonal cover code (OCC) can be applied. The OCC can be a Barker code or a Hadamard code.

In another example, the whole sequence generated by the ZC sequence or pseudo-random sequence can extend over the length of the initial signal. In one example, the sequence can be shorter and each symbol can be comprised of a shorter sequence that can be repeated multiple times in the frequency domain.

In another example, cyclic shifts, intra-symbol, and inter-symbol OCCs can be applied. The configuration of the sequence, including the base sequence, CS, and/or OCC can be predefined, or selected based on the frame structure. For example, 8 OCCs can be used corresponding to 8 TDD configurations. In cases where the sequence length is adjustable, the inter-symbol OCC may not be applied.

In some examples, the symbol duration of the initial signal or detection signal can be shorter than other symbols which can be implemented via repetition in the frequency domain. For example, the sequence can be repeated across PRBs. With an eMTC based design, 6 repetitions can occur in the frequency domain with each on one PRB. In the time domain, the symbol duration can be 6 times shorter than the symbol duration in 3GPP LTE Rel. 8.

Figure 5:
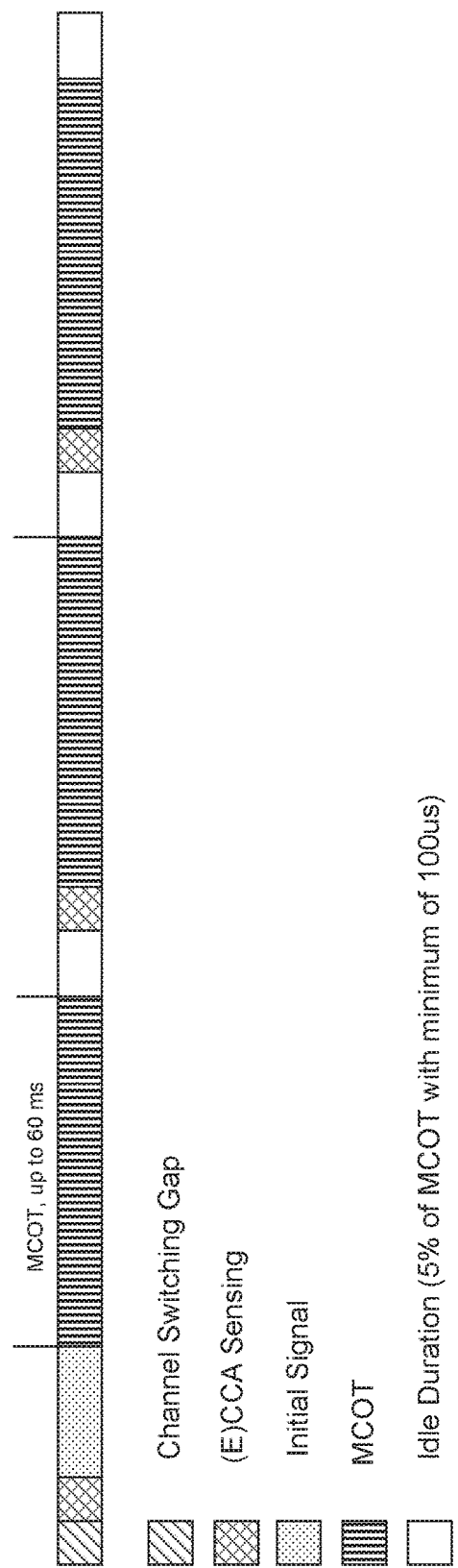
FIG. 5 illustrates an initial signal transmitted in the first maximum channel occupancy time (MCOT) in accordance with an example.

In one example, the initial symbol can be transmitted once per hopped channel, e.g. at the start of the first MCOT, as illustrated in FIG. 5. In the case of a dynamic TDD configuration, downlink control information (DCI) and enhanced interference mitigation and traffic adaptation (eIMTA) can be used for reconfiguration of a TDD structure in the following MCOT. For static TDD or frequency division duplexing (FDD), the initial signal can be transmitted once per hopped channel as illustrated in FIG. 5.

Figure 6A:
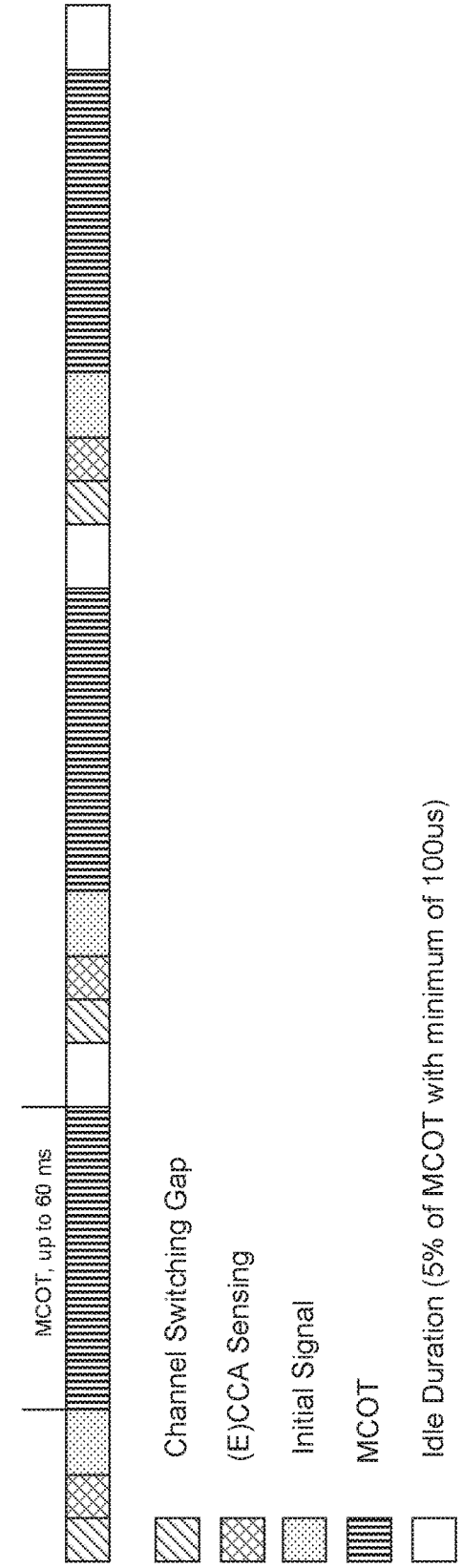
FIG. 6*a* illustrates an initial signal transmitted in multiple maximum channel occupancy times (MCOTs) in accordance with an example.

In another example, the initial signal or detection signal can be transmitted at multiple MCOTs in addition to the first MCOT, as illustrated in FIG. 6a. In this example, the transmission of the initial signal or detection signal at multiple MCOTs can provide a dynamic configuration of frame structure in scenarios in which dynamic TDD is adopted. The sensing duration before each MCOT can vary depending on the number of CCAs before sensing that the channel is idle.

Figure 6B:
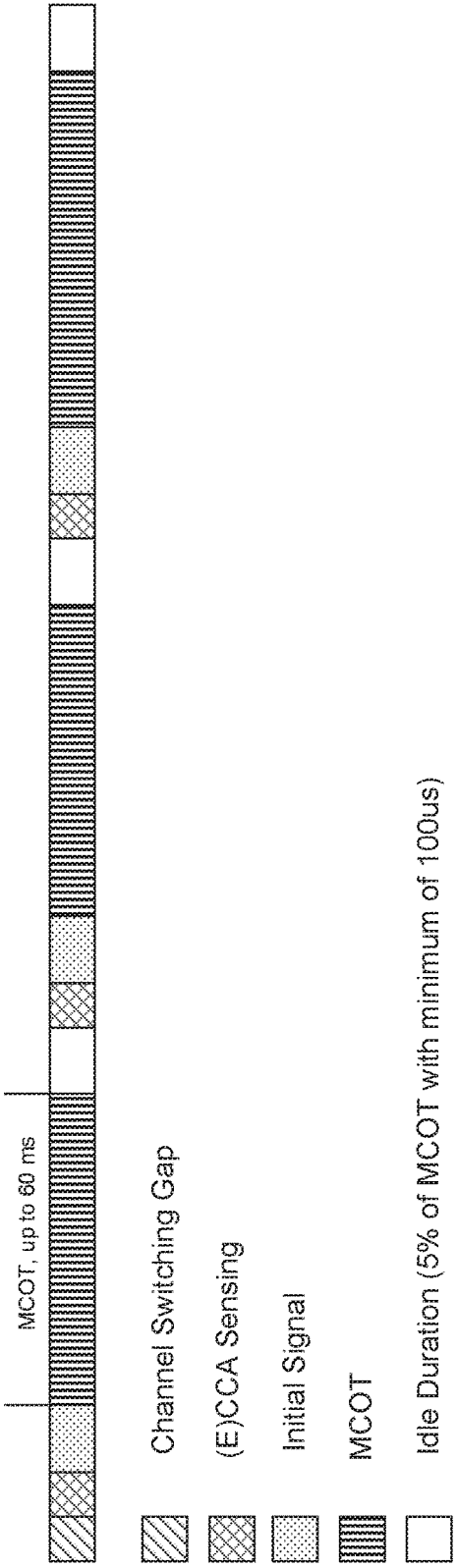
FIG. 6*b* illustrates an initial signal transmitted in multiple maximum channel occupancy times (MCOTs) in accordance with an example.

In one example, before the CCA for each MCOT, some duration can still be reserved for channel switching, in order to preserve the same structure for each MCOT, as illustrated in FIG. 6a. Alternatively, no duration may be reserved for channel switching before each MCOT, as illustrated in FIG. 6b.

Figure 7:
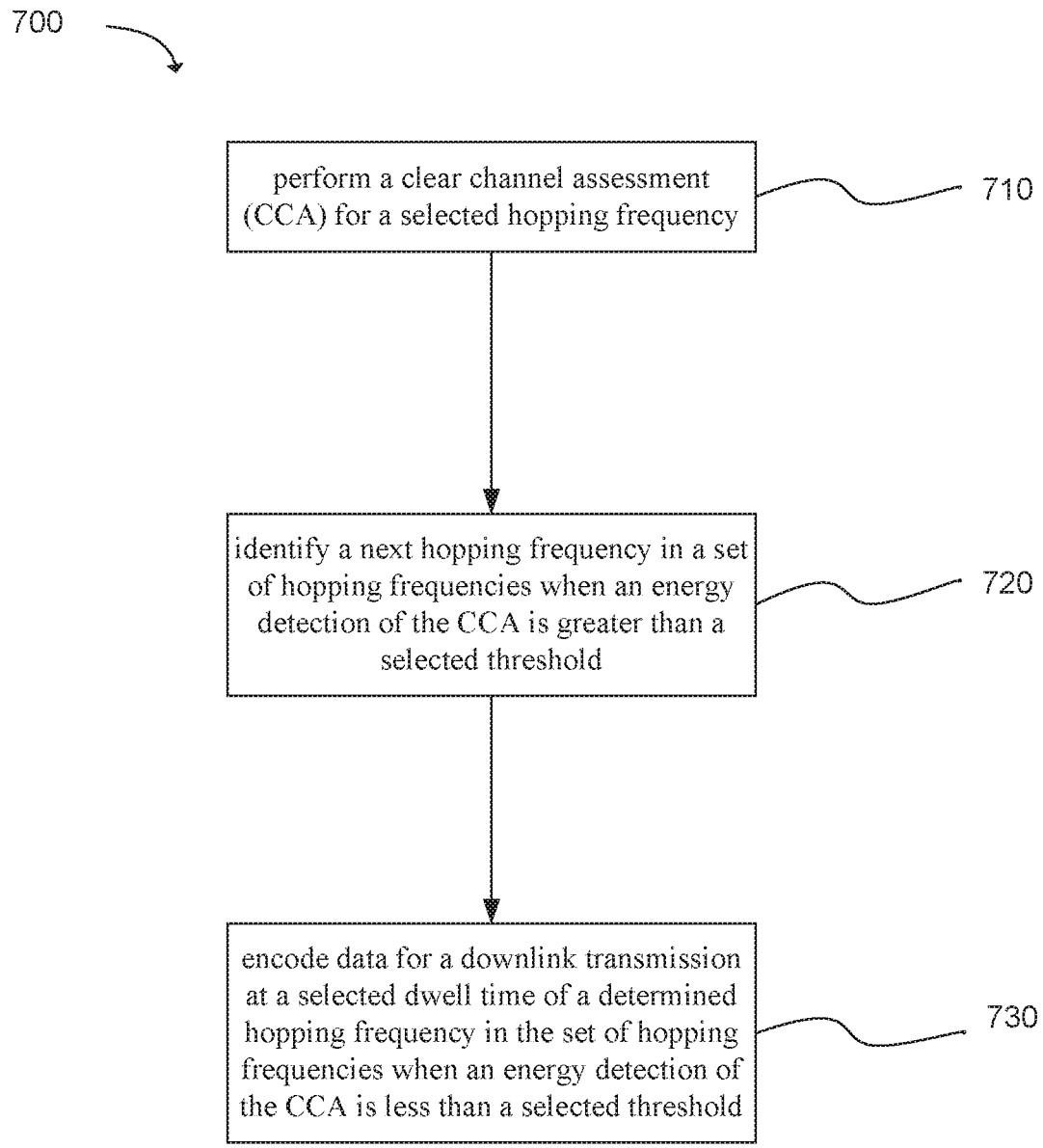
FIG. 7 depicts functionality of a next generation node B (gNB) operable for frequency hopping in enhanced machine type unlicensed communication (eMTC-U) in accordance with an example.

Another example provides functionality 700 of a next generation node B (gNB) operable for frequency hopping in enhanced machine type unlicensed communication (eMTC-U) and/or MulteFire communications, as shown in FIG. 7.

The gNB can comprise one or more processors. The one or more processors can be configured to perform a clear channel assessment (CCA) for a selected hopping frequency, as in block 710. The one or more processors can be configured to identify, determine, select, or establish a next hopping frequency in a set of hopping frequencies when an energy detection of the CCA is greater than a selected threshold, as in block 720. The one or more processors can be configured to encode data for a downlink transmission. The encoding and downlink may be based on eMTC-U. The data can be encoded for downlink transmission at a selected dwell time of a determined hopping frequency in the set of hopping frequencies when an energy detection of the CCA is less than a selected threshold, as in block 730. In one embodiment, the downlink transmission can be formatted based on e-MTC-U standards. In addition, the gNB can comprise a memory interface configured to send the set of hopping frequencies to a memory.

Figure 8:
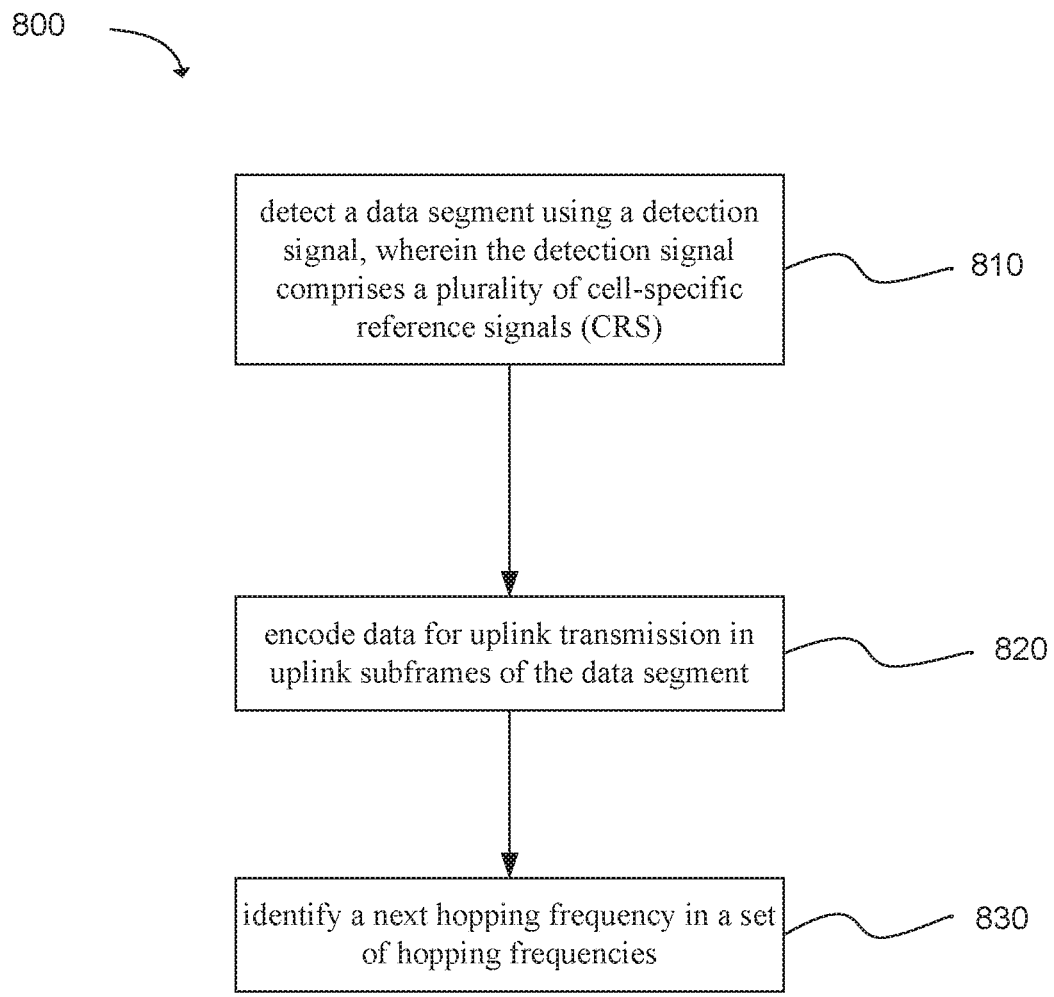
FIG. 8 illustrates functionality of a user equipment (UE) operable for frequency hopping in enhanced machine type unlicensed communication (eMTC-U) in accordance with an example.

Another example provides functionality 800 of a user equipment (UE) operable for frequency hopping in Multe-Fire communications, as shown in FIG. 8. In one embodiment, the communication can be based on e-MTC-U standards. The UE can comprise one or more processors. The one or more processors can be configured to detect a data segment using a detection signal, wherein the detection signal comprises a plurality of cell-specific reference signals (CRS), as in block 810. The one or more processors can be configured to encode data for uplink transmission in uplink subframes of the data segment, as in block 820. The one or more processors can be configured to identify, determine, select, or establish a next hopping frequency in a set of hopping frequencies, as in block 830. In addition, the UE can comprise a memory interface configured to send the data from a memory.

Figure 9:
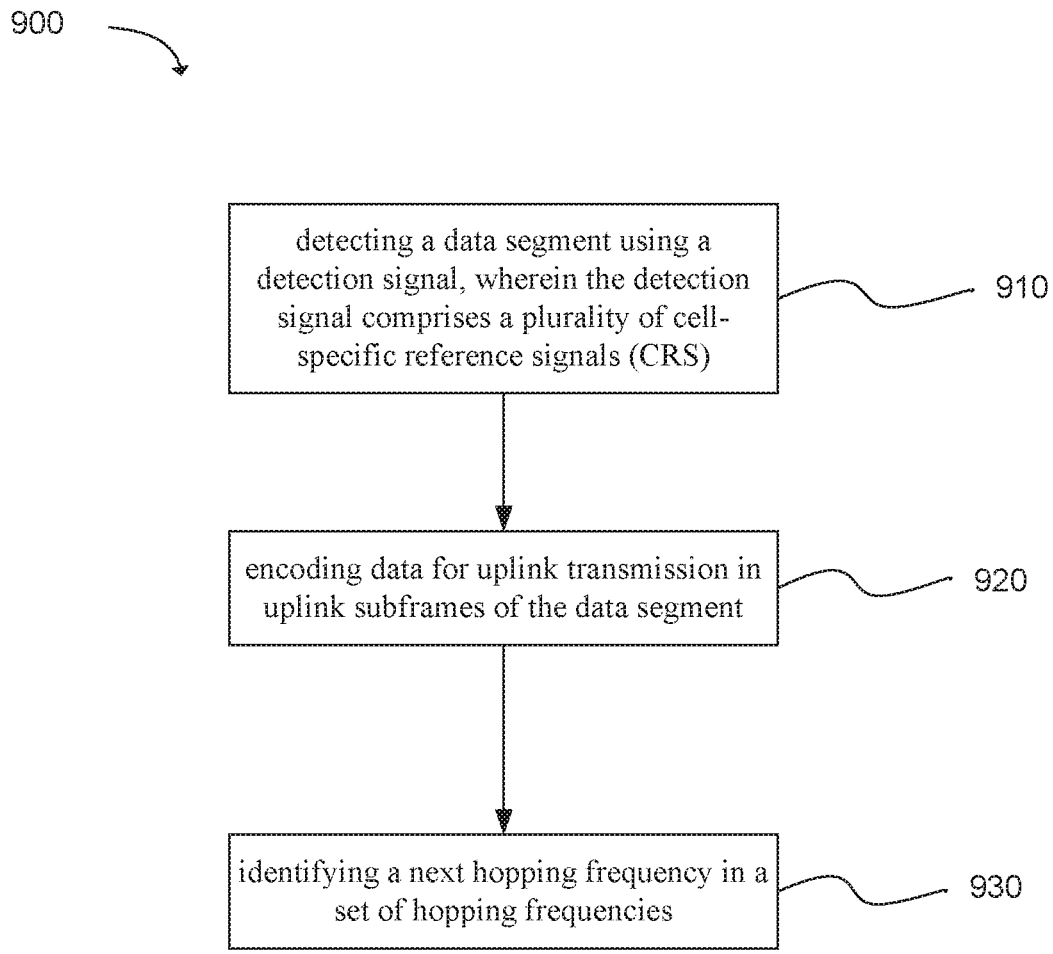
FIG. 9 depicts a flowchart of a machine readable storage medium having instructions embodied thereon for performing frequency hopping in enhanced machine type unlicensed communication (eMTC-U) in accordance with an example.

Another example provides at least one machine readable storage medium having instructions 900 embodied thereon for frequency hopping in MulteFire communications and/or enhanced machine type unlicensed (eMTC-U) communication, as shown in FIG. 9. The instructions can be executed on a machine, where the instructions are included on at least one computer readable medium or one non-transitory machine readable storage medium. The instructions when executed perform: detecting a data segment using a detection signal, wherein the detection signal comprises a plurality of cell-specific reference signals (CRS), as in block 910. The instructions when executed perform: encoding data for uplink transmission in uplink subframes of the data segment, as in block 920. The instructions when executed perform: identifying, determining, selecting, or establishing a next hopping frequency in a set of hopping frequencies, as in block 930.

While examples have been provided in which gNB has been specified, they are not intended to be limiting. An evolved node B (eNB) can be used in place of the gNB. Accordingly, unless otherwise stated, any example herein in which an eNodeB has been disclosed, can similarly be disclosed with the use of a gNB (Next Generation node B).

Figure 10:
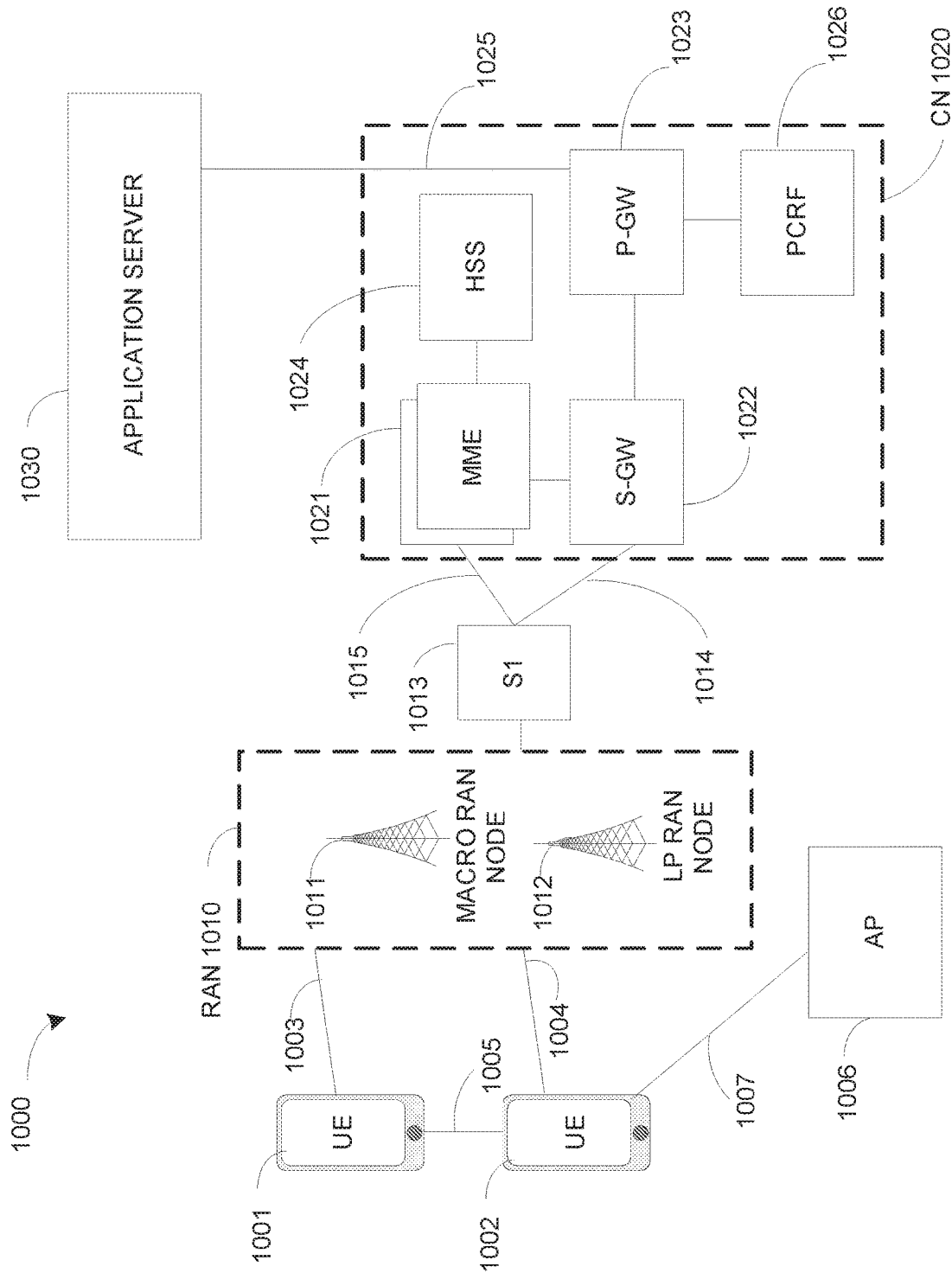
FIG. 10 illustrates an architecture of a wireless network in accordance with an example.

FIG. 10 illustrates an architecture of a system 1000 of a network in accordance with some embodiments. The system 1000 is shown to include a user equipment (UE) 1001 and a UE 1002. The UEs 1001 and 1002 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1001 and 1002 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1001 and 1002 may be configured to connect, e.g., communicatively couple, with a radio access network (RAN) 1010—the RAN 1010 may be, for example, an Evolved Universal Mobile Telecommunications System (UMTS) Terrestrial Radio Access Network (E-UTRAN), a NextGen RAN (NG RAN), or some other type of RAN. The UEs 1001 and 1002 utilize connections 1003 and 1004, respectively, each of which comprises a physical communications interface or layer (discussed in further detail below); in this example, the connections 1003 and 1004 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1001 and 1002 may further directly exchange communication data via a ProSe interface 1005. The ProSe interface 1005 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1002 is shown to be configured to access an access point (AP) 1006 via connection 1007. The connection 1007 can comprise a local wireless connection, such as a connection consistent with any IEEE 802.15 protocol, wherein the AP 1006 would comprise a wireless fidelity (WiFi®) router. In this example, the AP 1006 is shown to be connected to the Internet without connecting to the core network of the wireless system (described in further detail below).

The RAN 1010 can include one or more access nodes that enable the connections 1003 and 1004. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1010 may include one or more RAN nodes for providing macrocells, e.g., macro RAN node 1011, and one or more RAN nodes for providing femtocells or picocells (e.g., cells having smaller coverage areas, smaller user capacity, or higher bandwidth compared to macrocells), e.g., low power (LP) RAN node 1012.

Any of the RAN nodes 1011 and 1012 can terminate the air interface protocol and can be the first point of contact for the UEs 1001 and 1002. In some embodiments, any of the RAN nodes 1011 and 1012 can fulfill various logical functions for the RAN 1010 including, but not limited to, radio network controller (RNC) functions such as radio bearer management, uplink and downlink dynamic radio resource management and data packet scheduling, and mobility management.

In accordance with some embodiments, the UEs 1001 and 1002 can be configured to communicate using Orthogonal Frequency-Division Multiplexing (OFDM) communication signals with each other or with any of the RAN nodes 1011 and 1012 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1011 and 1012 to the UEs 1001 and 1002, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1001 and 1002. The physical downlink control channel (PDCCH) may carry information about the transport format and resource allocations related to the PDSCH channel, among other things. It may also inform the UEs 1001 and 1002 about the transport format, resource allocation, and H-ARQ (Hybrid Automatic Repeat Request) information related to the uplink shared channel. Typically, downlink scheduling (assigning control and shared channel resource blocks to the UE 1002 within a cell) may be performed at any of the RAN nodes 1011 and 1012 based on channel quality information fed back from any of the UEs 1001 and 1002. The downlink resource assignment information may be sent on the PDCCH used for (e.g., assigned to) each of the UEs 1001 and 1002.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1010 is shown to be communicatively coupled to a core network (CN) 1020—via an S1 interface 1013. In embodiments, the CN 1020 may be an evolved packet core (EPC) network, a NextGen Packet Core (NPC) network, or some other type of CN. In this embodiment the S1 interface 1013 is split into two parts: the S1-U interface 1014, which carries traffic data between the RAN nodes 1011 and 1012 and the serving gateway (S-GW) 1022, and the S1-mobility management entity (MME) interface 1015, which is a signaling interface between the RAN nodes 1011 and 1012 and MMEs 1021.

In this embodiment, the CN 1020 comprises the MMEs 1021, the S-GW 1022, the Packet Data Network (PDN) Gateway (P-GW) 1023, and a home subscriber server (HSS) 1024. The MMEs 1021 may be similar in function to the control plane of legacy Serving General Packet Radio Service (GPRS) Support Nodes (SGSN). The MMEs 1021 may manage mobility aspects in access such as gateway selection and tracking area list management. The HSS 1024 may comprise a database for network users, including subscription-related information to support the network entities' handling of communication sessions. The CN 1020 may comprise one or several HSSs 1024, depending on the number of mobile subscribers, on the capacity of the equipment, on the organization of the network, etc. For example, the HSS 1024 can provide support for routing/roaming, authentication, authorization, naming/addressing resolution, location dependencies, etc.

The S-GW 1022 may terminate the S1 interface 1013 towards the RAN 1010, and routes data packets between the RAN 1010 and the CN 1020. In addition, the S-GW 1022 may be a local mobility anchor point for inter-RAN node handovers and also may provide an anchor for inter-3GPP mobility. Other responsibilities may include lawful intercept, charging, and some policy enforcement.

The P-GW 1023 may terminate an SGi interface toward a PDN. The P-GW 1023 may route data packets between the EPC network 1023 and external networks such as a network including the application server 1030 (alternatively referred to as application function (AF)) via an Internet Protocol (IP) interface 1025. Generally, the application server 1030 may be an element offering applications that use IP bearer resources with the core network (e.g., UMTS Packet Services (PS) domain, LTE PS data services, etc.). In this embodiment, the P-GW 1023 is shown to be communicatively coupled to an application server 1030 via an IP communications interface 1025. The application server 1030 can also be configured to support one or more communication services (e.g., Voice-over-Internet Protocol (VoIP) sessions, PTT sessions, group communication sessions, social networking services, etc.) for the UEs 1001 and 1002 via the CN 1020.

The P-GW 1023 may further be a node for policy enforcement and charging data collection. Policy and Charging Enforcement Function (PCRF) 1026 is the policy and charging control element of the CN 1020. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1026 may be communicatively coupled to the application server 1030 via the P-GW 1023. The application server 1030 may signal the PCRF 1026 to indicate a new service flow and select the appropriate Quality of Service (QoS) and charging parameters. The PCRF 1026 may provision this rule into a Policy and Charging Enforcement Function (PCEF) (not shown) with the appropriate traffic flow template (TFT) and QoS class of identifier (QCI), which commences the QoS and charging as specified by the application server 1030.

Figure 11:
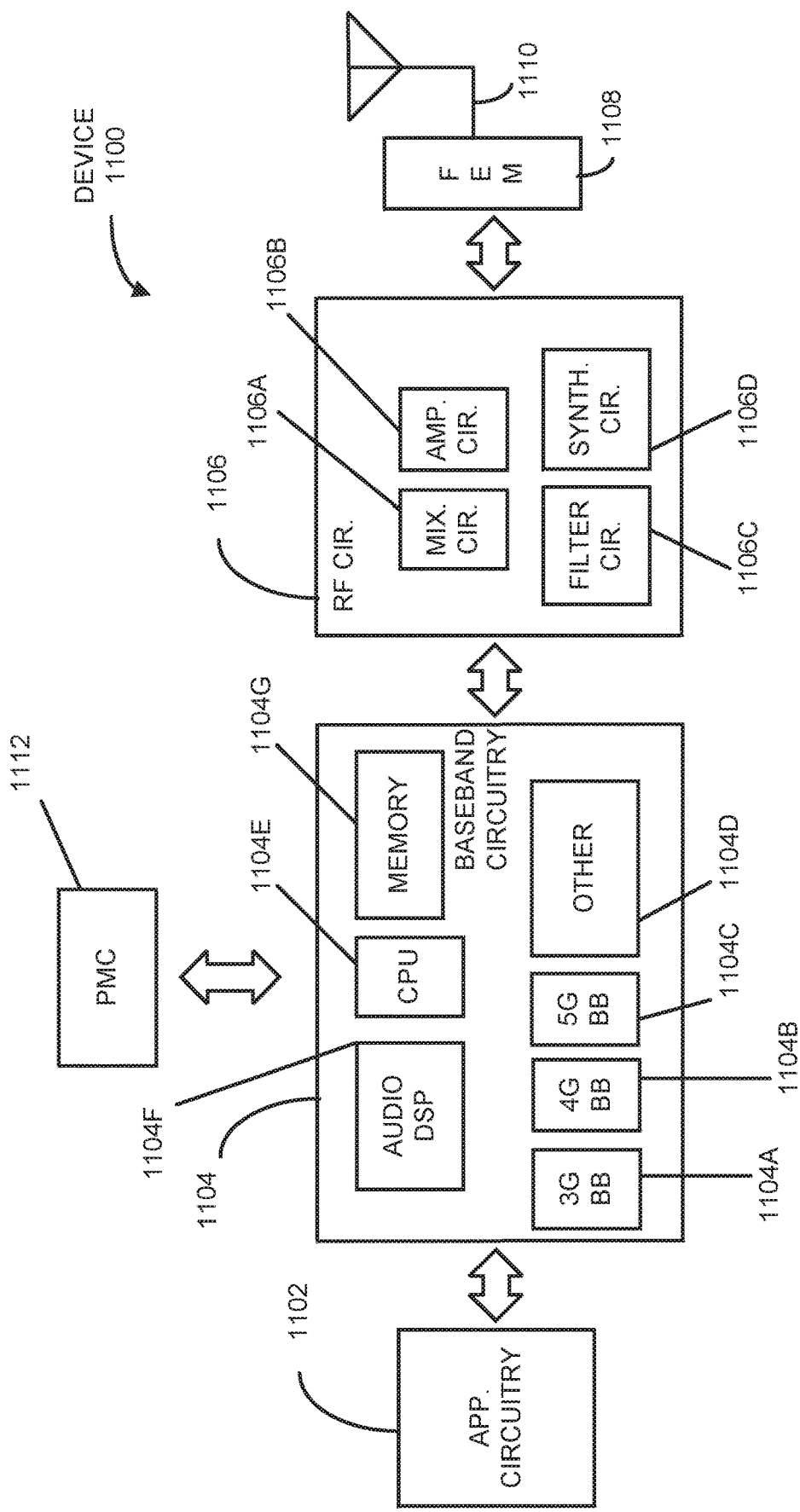
FIG. 11 illustrates a diagram of a wireless device (e.g., UE) in accordance with an example.

FIG. 11 illustrates example components of a device 1100 in accordance with some embodiments. In some embodiments, the device 1100 may include application circuitry 1102, baseband circuitry 1104, Radio Frequency (RF) circuitry 1106, front-end module (FEM) circuitry 1108, one or more antennas 1110, and power management circuitry (PMC) 1112 coupled together at least as shown. The components of the illustrated device 1100 may be included in a UE or a RAN node. In some embodiments, the device 1100 may include less elements (e.g., a RAN node may not utilize application circuitry 1102, and instead include a processor/controller to process IP data received from an EPC). In some embodiments, the device 1100 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1100. In some embodiments, processors of application circuitry 1102 may process IP data packets received from an EPC.

The baseband circuitry 1104 may include circuitry such as, but not limited to, one or more single-core or multi-core processors. The baseband circuitry 1104 may include one or more baseband processors or control logic to process baseband signals received from a receive signal path of the RF circuitry 1106 and to generate baseband signals for a transmit signal path of the RF circuitry 1106. Baseband processing circuitry 1104 may interface with the application circuitry 1102 for generation and processing of the baseband signals and for controlling operations of the RF circuitry 1106. For example, in some embodiments, the baseband circuitry 1104 may include a third generation (3G) baseband processor 1104*a*, a fourth generation (4G) baseband processor 1104*b*, a fifth generation (5G) baseband processor 1104*c*, or other baseband processor(s) 1104*d* for other existing generations, generations in development or to be developed in the future (e.g., second generation (2G), sixth generation (6G), etc.). The baseband circuitry 1104 (e.g., one or more of baseband processors 1104*a-d*) may handle various radio control functions that enable communication with one or more radio networks via the RF circuitry 1106. In other embodiments, some or all of the functionality of baseband processors 1104*a-d* may be included in modules stored in the memory 1104*g* and executed via a Central Processing Unit (CPU) 1104*e*. The radio control functions may include, but are not limited to, signal modulation/demodulation, encoding/decoding, radio frequency shifting, etc. In some embodiments, modulation/demodulation circuitry of the baseband circuitry 1104 may include Fast-Fourier Transform (FFT), precoding, or constellation mapping/demapping functionality. In some embodiments, encoding/decoding circuitry of the baseband circuitry 1104 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include one or more audio digital signal processor(s) (DSP) 1104*f* The audio DSP(s) 1104*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1104 and the application circuitry 1102 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1104 is configured to support radio communications of more than one wireless protocol may be referred to as multi-mode baseband circuitry.

RF circuitry 1106 may enable communication with wireless networks using modulated electromagnetic radiation through a non-solid medium. In various embodiments, the RF circuitry 1106 may include switches, filters, amplifiers, etc. to facilitate the communication with the wireless network. RF circuitry 1106 may include a receive signal path which may include circuitry to down-convert RF signals received from the FEM circuitry 1108 and provide baseband signals to the baseband circuitry 1104. RF circuitry 1106 may also include a transmit signal path which may include circuitry to up-convert baseband signals provided by the baseband circuitry 1104 and provide RF output signals to the FEM circuitry 1108 for transmission.

In some embodiments, the receive signal path of the RF circuitry 1106 may include mixer circuitry 1106a, amplifier circuitry 1106b and filter circuitry 1106c. In some embodiments, the transmit signal path of the RF circuitry 1106 may include filter circuitry 1106c and mixer circuitry 1106a. RF circuitry 1106 may also include synthesizer circuitry 1106d for synthesizing a frequency for use by the mixer circuitry 1106a of the receive signal path and the transmit signal path. In some embodiments, the mixer circuitry 1106a of the receive signal path may be configured to down-convert RF signals received from the FEM circuitry 1108 based on the synthesized frequency provided by synthesizer circuitry 1106d. The amplifier circuitry 1106b may be configured to amplify the down-converted signals and the filter circuitry 1106c may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a necessity. In some embodiments, mixer circuitry 1106a of the receive signal path may comprise passive mixers, although the scope of the embodiments is not limited in this respect.

In some embodiments, the mixer circuitry 1106a of the transmit signal path may be configured to up-convert input baseband signals based on the synthesized frequency provided by the synthesizer circuitry 1106d to generate RF output signals for the FEM circuitry 1108. The baseband signals may be provided by the baseband circuitry 1104 and may be filtered by filter circuitry 1106c.

In some embodiments, the mixer circuitry 1106a of the receive signal path and the mixer circuitry 1106a of the transmit signal path may include two or more mixers and may be arranged for quadrature downconversion and upconversion, respectively. In some embodiments, the mixer circuitry 1106a of the receive signal path and the mixer circuitry 1106a of the transmit signal path may include two or more mixers and may be arranged for image rejection (e.g., Hartley image rejection). In some embodiments, the mixer circuitry 1106a of the receive signal path and the mixer circuitry 1106a may be arranged for direct downconversion and direct upconversion, respectively. In some embodiments, the mixer circuitry 1106a of the receive signal path and the mixer circuitry 1106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1106 may include analog-to-digital converter (ADC) and digital-to-analog converter (DAC) circuitry and the baseband circuitry 1104 may include a digital baseband interface to communicate with the RF circuitry 1106.

In some dual-mode embodiments, a separate radio IC circuitry may be provided for processing signals for each spectrum, although the scope of the embodiments is not limited in this respect.

In some embodiments, the synthesizer circuitry 1106d may be a fractional-N synthesizer or a fractional N/N+1 synthesizer, although the scope of the embodiments is not limited in this respect as other types of frequency synthesizers may be suitable. For example, synthesizer circuitry 1106d may be a delta-sigma synthesizer, a frequency multiplier, or a synthesizer comprising a phase-locked loop with a frequency divider.

The synthesizer circuitry 1106d may be configured to synthesize an output frequency for use by the mixer circuitry 1106a of the RF circuitry 1106 based on a frequency input and a divider control input. In some embodiments, the synthesizer circuitry 1106d may be a fractional N/N+1 synthesizer.

In some embodiments, frequency input may be provided by a voltage controlled oscillator (VCO), although that is not a necessity. Divider control input may be provided by either the baseband circuitry 1104 or the applications processor 1102 depending on the desired output frequency. In some embodiments, a divider control input (e.g., N) may be determined from a look-up table based on a channel indicated by the applications processor 1102.

Synthesizer circuitry 1106d of the RF circuitry 1106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1106 may include an IQ/polar converter.

FEM circuitry 1108 may include a receive signal path which may include circuitry configured to operate on RF signals received from one or more antennas 1110, amplify the received signals and provide the amplified versions of the received signals to the RF circuitry 1106 for further processing. FEM circuitry 1108 may also include a transmit signal path which may include circuitry configured to amplify signals for transmission provided by the RF circuitry 1106 for transmission by one or more of the one or more antennas 1110. In various embodiments, the amplification through the transmit or receive signal paths may be done solely in the RF circuitry 1106, solely in the FEM 1108, or in both the RF circuitry 1106 and the FEM 1108.

In some embodiments, the FEM circuitry 1108 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1106). The transmit signal path of the FEM circuitry 1108 may include a power amplifier (PA) to amplify input RF signals (e.g., provided by RF circuitry 1106), and one or more filters to generate RF signals for subsequent transmission (e.g., by one or more of the one or more antennas 1110).

In some embodiments, the PMC 1112 may manage power provided to the baseband circuitry 1104. In particular, the PMC 1112 may control power-source selection, voltage scaling, battery charging, or DC-to-DC conversion. The PMC 1112 may often be included when the device 1100 is capable of being powered by a battery, for example, when the device is included in a UE. The PMC 1112 may increase the power conversion efficiency while providing desirable implementation size and heat dissipation characteristics.

While FIG. 11 shows the PMC 1112 coupled only with the baseband circuitry 1104. However, in other embodiments, the PMC 1112 may be additionally or alternatively coupled with, and perform similar power management operations for, other components such as, but not limited to, application circuitry 1102, RF circuitry 1106, or FEM 1108.

In some embodiments, the PMC 1112 may control, or otherwise be part of, various power saving mechanisms of the device 1100. For example, if the device 1100 is in an RRC_Connected state, where it is still connected to the RAN node as it expects to receive traffic shortly, then it may enter a state known as Discontinuous Reception Mode (DRX) after a period of inactivity. During this state, the device 1100 may power down for brief intervals of time and thus save power.

If there is no data traffic activity for an extended period of time, then the device 1100 may transition off to an RRC_Idle state, where it disconnects from the network and does not perform operations such as channel quality feedback, handover, etc. The device 1100 goes into a very low power state and it performs paging where again it periodically wakes up to listen to the network and then powers down again. The device 1100 may not receive data in this state, in order to receive data, it can transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1102 and processors of the baseband circuitry 1104 may be used to execute elements of one or more instances of a protocol stack. For example, processors of the baseband circuitry 1104, alone or in combination, may be used execute Layer 3, Layer 2, or Layer 1 functionality, while processors of the application circuitry 1104 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 12:
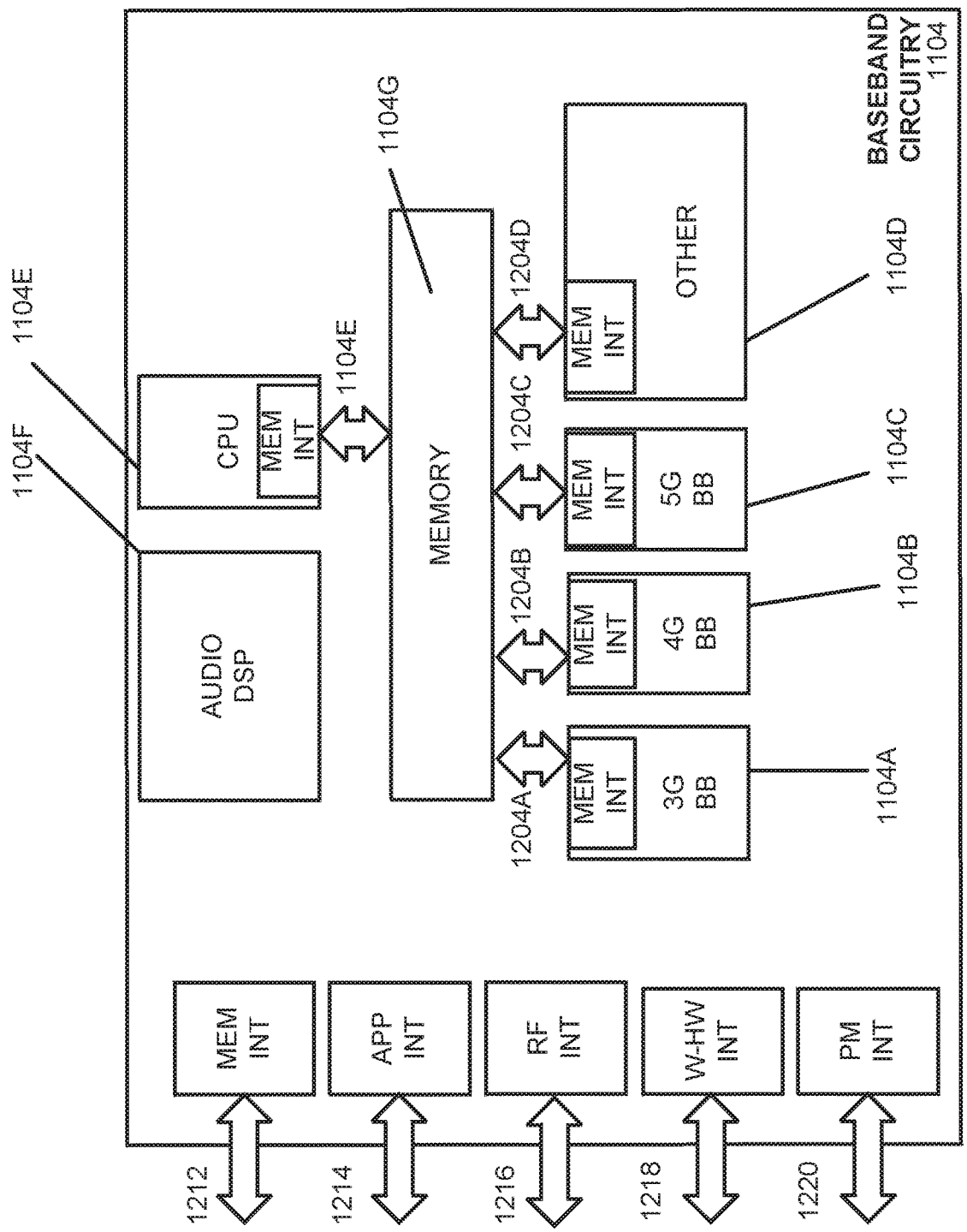
FIG. 12 illustrates interfaces of baseband circuitry in accordance with an example.

FIG. 12 illustrates example interfaces of baseband circuitry in accordance with some embodiments. As discussed above, the baseband circuitry 1104 of FIG. 11 may comprise processors 1104a-1104e and a memory 1104g utilized by said processors. Each of the processors 1104a-1104e may include a memory interface, 1204a-1204e, respectively, to send/receive data to/from the memory 1104g.

The baseband circuitry 1104 may further include one or more interfaces to communicatively couple to other circuitries/devices, such as a memory interface 1212 (e.g., an interface to send/receive data to/from memory external to the baseband circuitry 1104), an application circuitry interface 1214 (e.g., an interface to send/receive data to/from the application circuitry 1102 of FIG. 11), an RF circuitry interface 1216 (e.g., an interface to send/receive data to/from RF circuitry 1106 of FIG. 11), a wireless hardware connectivity interface 1218 (e.g., an interface to send/receive data to/from Near Field Communication (NFC) components, Bluetooth® components (e.g., Bluetooth® Low Energy), Wi-Fi® components, and other communication components), and a power management interface 1220 (e.g., an interface to send/receive power or control signals to/from the PMC 1112.

Figure 13:
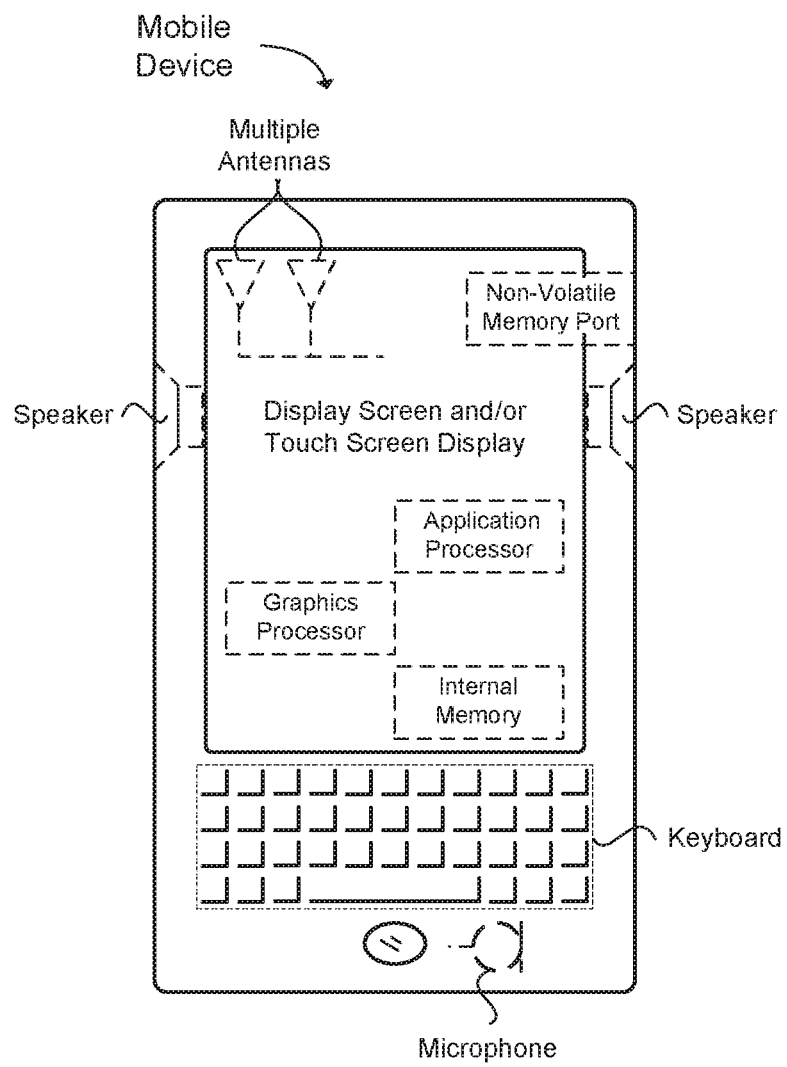
FIG. 13 illustrates a diagram of a wireless device (e.g., UE) in accordance with an example.

FIG. 13 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 13 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a next generation node B (gNB) operable for frequency hopping in MulteFire and/or e-MTC-U communications, the apparatus comprising: one or more processors configured to: perform a clear channel assessment (CCA) for a selected hopping frequency; identify a next hopping frequency in a set of hopping frequencies when an energy detection of the CCA is greater than a selected threshold; and encode data for a downlink transmission at a selected dwell time of a determined hopping frequency in the set of hopping frequencies when an energy detection of the CCA is less than a selected threshold; and a memory interface configured to send the set of hopping frequencies to a memory.

Example 2 includes the apparatus of Example 1, wherein the one or more processors are further configured to: decode data in an uplink transmission at one of the selected hopping frequencies.

Example 3 includes the apparatus of Example 1, wherein the one or more processors are further configured to: encode a detection signal located after the CCA, wherein the detection signal comprises a plurality of cell-specific reference signals (CRS).

Example 4 includes the apparatus of Example 3, wherein the plurality of CRSs have a Zadoff-Chu structure.

Example 5 includes the apparatus of Example 3, wherein the detection signal comprising the plurality of CRSs is transmitted in a plurality of orthogonal frequency division multiplexing (OFDM) symbols without additional data in the OFDM symbols to enable power to be allocated to the transmission of the plurality of reference signals.

Example 6 includes the apparatus of any of Examples 1 to 5, wherein the one or more processors are further configured to: encode the data for the downlink transmission in a data segment of the selected dwell time of the determined hopping frequencies in the set of hopping frequencies, wherein the data segment has a length of 75 milliseconds (ms) and the dwell time has a length of 80 ms.

Example 7 includes the apparatus of any of Examples 1 to 5, wherein the one or more processors are further configured to: perform an extended clear channel assessment (eCCA) for the selected hopping frequency when the energy detection of the CCA is greater than a selected threshold.

Example 8 includes the apparatus of Example 7, wherein the eCCA is continued for up to 2 orthogonal frequency division multiplexing (OFDM) symbols.

Example 9 includes the apparatus of Example 8, wherein the eCCA is continued for an additional 1 millisecond.

Example 10 includes the apparatus of any of Examples 1 to 5, wherein the one or more processors are further configured to: encode a plurality of cell-specific reference signals (CRSs) in the downlink transmission within the data.

Example 11 includes an apparatus of a user equipment (UE) operable for frequency hopping in MulteFire communications, the apparatus comprising: one or more processors configured to: detect a data segment using a detection signal, wherein the detection signal comprises a plurality of cell-specific reference signals (CRS); encode data for uplink transmission in uplink subframes of the data segment; and identify a next hopping frequency in a set of hopping frequencies; and a memory interface configured to send the data from a memory.

Example 12 includes the apparatus of Example 11, wherein the one or more processors are further configured to: perform blind detection of the detection signal to determine a location of a subsequent data segment when a next generation node B (gNB) skips a hopping frequency and time.

Example 13 includes the apparatus of Example 11, wherein the detection signal comprising the plurality of CRSs is received in a plurality of orthogonal frequency division multiplexing (OFDM) symbols without additional data in the OFDM symbols to enable power to be allocated to the receiving of the plurality of reference signals.

Example 14 includes the apparatus of any of Examples 11 to 13, wherein the detection signal comprises a plurality of cell-specific reference signals (CRS) to enable the UE to detect a selected dwell time of a determined hopping frequency.

Example 15 includes the apparatus of Example 14, wherein the detection signal comprising the plurality of CRSs has a Zadoff-Chu sequence.

Example 16 includes the apparatus of any of Examples 11 to 13, wherein the one or more processors are further configured to: decode a plurality of cell-specific reference signals (CRSs) in the downlink transmission within the data.

Example 17 includes at least one machine readable storage medium having instructions embodied thereon for frequency hopping in MulteFire communications, the instructions when executed by one or more processors at a user equipment (UE) perform the following: detecting a data segment using a detection signal, wherein the detection signal comprises a plurality of cell-specific reference signals (CRS); encoding data for uplink transmission in uplink subframes of the data segment; and identifying a next hopping frequency in a set of hopping frequencies.

Example 18 includes the at least one machine readable storage medium of Example 17, further comprising instructions that when executed perform: performing blind detection of the detection signal to determine a location of a subsequent data segment when a next generation node B (gNB) skips a hopping frequency and time.

Example 19 includes the at least one machine readable storage medium of Example 17, wherein the detection signal comprising the plurality of CRSs is received in a plurality of orthogonal frequency division multiplexing (OFDM) symbols without additional data in the OFDM symbols to enable power to be allocated to the receiving of the plurality of reference signals.

Example 20 includes the at least one machine readable storage medium of any of Examples 17 to 19, wherein the detection signal comprises a plurality of cell-specific reference signals (CRS) to enable the UE to detect a selected dwell time of a determined hopping frequency.

Example 21 includes the at least one machine readable storage medium of Example 20, wherein the detection signal comprising the plurality of CRSs has a Zadoff-Chu sequence.

Example 22 includes the at least one machine readable storage medium of any of Examples 17 to 19, further comprising instructions that when executed perform: decoding a plurality of cell-specific reference signals (CRSs) in the downlink transmission within the data.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a next generation node B (gNB) operable for frequency hopping in MulteFire communications, the apparatus comprising:
one or more processors configured to:
perform a channel access procedure for a selected hopping frequency;
identify a next hopping frequency in a set of hopping frequencies when an energy detection of the channel access procedure is greater than a selected threshold;
encode data for a downlink transmission at a selected dwell time of a determined hopping frequency in the set of hopping frequencies when an energy detection of the channel access procedure is less than a selected threshold; and
encode a detection signal located after the channel access procedure, wherein the detection signal comprises one or more cell-specific reference signals (CRSs) and is to be transmitted in a plurality of orthogonal frequency division multiplexing (OFDM) symbols without additional data in the OFDM symbols to enable power to be allocated to the transmission of the one or more reference signals; and a memory interface configured to send the set of hopping frequencies to a memory.

2. The apparatus of claim 1, wherein the one or more processors are further configured to:

decode data in an uplink transmission at one of the selected hopping frequencies.

3. The apparatus of claim 1, wherein the one or more CRSs have a Zadoff-Chu structure.

4. The apparatus of claim 1, wherein the one or more processors are further configured to:

encode the data for the downlink transmission in a data segment of the selected dwell time of the determined hopping frequencies in the set of hopping frequencies, wherein the data segment has a length of 75 milliseconds (ms) and the dwell time has a length of 80 ms.

5. The apparatus of claim 1, wherein the one or more processors are further configured to:

encode one or more cell-specific reference signals (CRSS) in the downlink transmission within the data.

6. The apparatus of claim 1, further comprising a transceiver configured to:

transmit the data for downlink transmission at the selected dwell time of the determined hopping frequency in the set of hopping frequencies when the energy detection of the channel access procedure is less than the selected threshold.

* * * * *